United States Patent
Chakravarthy et al.

(10) Patent No.: US 10,552,544 B2
(45) Date of Patent: Feb. 4, 2020

(54) METHODS AND SYSTEMS OF AUTOMATED ASSISTANT IMPLEMENTATION AND MANAGEMENT

(71) Applicants: Sriram Chakravarthy, Saratoga, CA (US); Madhav Vodnala, San Jose, CA (US); Ram Menon, Los Altos, CA (US)

(72) Inventors: Sriram Chakravarthy, Saratoga, CA (US); Madhav Vodnala, San Jose, CA (US); Ram Menon, Los Altos, CA (US)

( * ) Notice: Subject to any disclaimer, the term of this patent is extended or adjusted under 35 U.S.C. 154(b) by 0 days.

(21) Appl. No.: 15/701,952

(22) Filed: Sep. 12, 2017

(65) Prior Publication Data
US 2018/0129648 A1 May 10, 2018

Related U.S. Application Data

(60) Provisional application No. 62/393,093, filed on Sep. 12, 2016.

(51) Int. Cl.
*G06F 17/27* (2006.01)
*G06F 17/28* (2006.01)
(Continued)

(52) U.S. Cl.
CPC ............ *G06F 17/289* (2013.01); *G06F 17/24* (2013.01); *G06F 17/2705* (2013.01); *G06N 3/006* (2013.01); *G06N 20/00* (2019.01)

(58) Field of Classification Search
CPC ......... G10L 15/26; G10L 13/00; G10L 13/02; G10L 13/08; G10L 15/1815;
(Continued)

(56) References Cited

U.S. PATENT DOCUMENTS

| 7,669,177 B2* | 2/2010 | Gerber ............... G06F 9/44505 707/705 |
| 8,660,849 B2* | 2/2014 | Gruber ............... G06F 17/3087 704/275 |
| 8,706,503 B2* | 4/2014 | Cheyer ............... G06F 17/3087 704/275 |
| 8,880,401 B2* | 11/2014 | Moore ................ G06Q 20/085 379/88.01 |

(Continued)

*Primary Examiner* — Vijay B Chawan

(57) ABSTRACT

In one aspect, a computerized method useful for implementing and managing an Automated assistant translator between an Automated assistant service and a plurality of third-party messaging platforms includes the step of deploying an Automated assistant in a plurality of third-party messaging platforms. The method includes the step of, with the Automated assistant, receiving a conversational input from a human user via a first third-party messaging platform of the plurality of third-party messaging platforms. The method includes the step of parsing the conversation input. The method includes the step of determining a request for additional information in the conversation input. The method includes the step of retrieving a set of information relating to the request for additional information in the conversation input. The method includes the step of generating a natural-language output that includes the information. The method includes the step of providing the natural-language output to a translator system, wherein the translator system comprises one or more specific runtime translators that translate an Automated assistant output into each messaging platform's protocol of the plurality of third-party messaging platforms. The method includes the step of, with the translator system, converting the natural-language output to a format of the first third-party messaging platform. The method includes the step of communicating the converted form of the natural-language output that is the format of the first third-party messaging platform to the first third-party messaging platform.

14 Claims, 7 Drawing Sheets

(51) Int. Cl.
  *G06F 17/24*    (2006.01)
  *G06N 20/00*    (2019.01)
  *G06N 3/00*     (2006.01)

(58) Field of Classification Search
  CPC ... G10L 15/1822; G10L 15/183; G10L 15/22;
        G10L 15/265; G10L 21/06; G06F 17/28;
        G06F 17/2785; G06F 17/2765; G06F
        17/30654; G06F 17/30684; G06F
        17/3087; G06F 17/289; G06F 17/1863;
        H04M 1/6091; H04M 1/72547; H04M
        15/109; H04M 15/56; H04M 15/57;
        H04M 15/63; H04M 15/7655; G06N
        99/005
  USPC ....... 704/231, 275, 246, 247, 251, 252, 258,
              704/270, 270.1, 228, 234, 235, 255, 257,
              704/260, 9; 379/88.01, 8, 88.03;
              707/708; 715/747

See application file for complete search history.

(56) References Cited

U.S. PATENT DOCUMENTS

| | | | | |
|---|---|---|---|---|
| 8,924,217 | B2* | 12/2014 | Moore | G06Q 20/085 |
| | | | | 379/88.01 |
| 8,930,191 | B2* | 1/2015 | Gruber | G06F 17/3087 |
| | | | | 704/257 |
| 8,942,986 | B2* | 1/2015 | Cheyer | G06F 17/3087 |
| | | | | 704/275 |
| 9,117,447 | B2* | 8/2015 | Gruber | G06F 17/3087 |
| 9,201,865 | B2* | 12/2015 | Tran | G06F 17/2785 |
| 9,386,152 | B2* | 7/2016 | Riahi | G06N 99/005 |
| 9,548,050 | B2* | 1/2017 | Gruber | G06F 17/3087 |
| 2003/0187641 | A1* | 10/2003 | Moore | G06Q 20/085 |
| | | | | 704/235 |
| 2011/0202347 | A1* | 8/2011 | Moore | G06Q 20/085 |
| | | | | 704/260 |
| 2013/0046722 | A1* | 2/2013 | Hanson | H04L 69/22 |
| | | | | 706/47 |
| 2014/0270108 | A1* | 9/2014 | Riahi | G06N 99/005 |
| | | | | 379/88.01 |
| 2014/0270109 | A1* | 9/2014 | Riahi | G06N 99/005 |
| | | | | 379/88.01 |
| 2017/0132019 | A1* | 5/2017 | Karashchuk | H04W 4/12 |

* cited by examiner

METHODS AND SYSTEMS OF AUTOMATED ASSISTANT IMPLEMENTATION AND MANAGEMENT

CROSS-REFERENCE TO RELATED APPLICATIONS

This application is a claims priority, to U.S. provisional patent application No. 62/393,093, titled METHODS AND SYSTEMS OF CHAT-BOT IMPLEMENTATION AND MANAGEMENT and filed on 12 Sep. 2016. This provisional application is hereby incorporated by reference in its entirety.

BACKGROUND

Users may wish to query various enterprises about particular topics. User can use various messaging services to contact said entities. For example, a user may contact a bank via a messaging application to inquire about banking hours or other services. Automated assistants are increasingly in popularity and utility. Accordingly, rather than using a human agent to respond, many entities are utilizing Automated assistants to respond to the user's query.

It is noted, however, that many users utilized various third-party messaging applications to interact with said entities. These third-party messaging applications can have various formatting rules, proprietary messaging protocols and the like. Accordingly, a system and method for translating an enterprise's Automated assistant output to a format that is useable by various third-party messaging applications is needed.

SUMMARY OF THE INVENTION

In one aspect, a computerized method useful for implementing and managing an Automated assistant translator between an Automated assistant service and a plurality of third-party messaging platforms includes the step of deploying an Automated assistant in a plurality of third-party messaging platforms. The method includes the step of, with the Automated assistant, receiving a conversational input from a human user via a first third-party messaging platform of the plurality of third-party messaging platforms. The method includes the step of parsing the conversation input. The method includes the step of determining a request for additional information in the conversation input. The method includes the step of retrieving a set of information relating to the request for additional information in the conversation input. The method includes the step of generating a natural-language output that includes the information. The method includes the step of providing the natural-language output to a translator system, wherein the translator system comprises one or more specific runtime translators that translate an Automated assistant output into each messaging platform's protocol of the plurality of third-party messaging platforms. The method includes the step of, with the translator system, converting the natural-language output to a format of the first third-party messaging platform. The method includes the step of communicating the converted form of the natural-language output that is the format of the first third-party messaging platform to the first third-party messaging platform.

Figure 1:
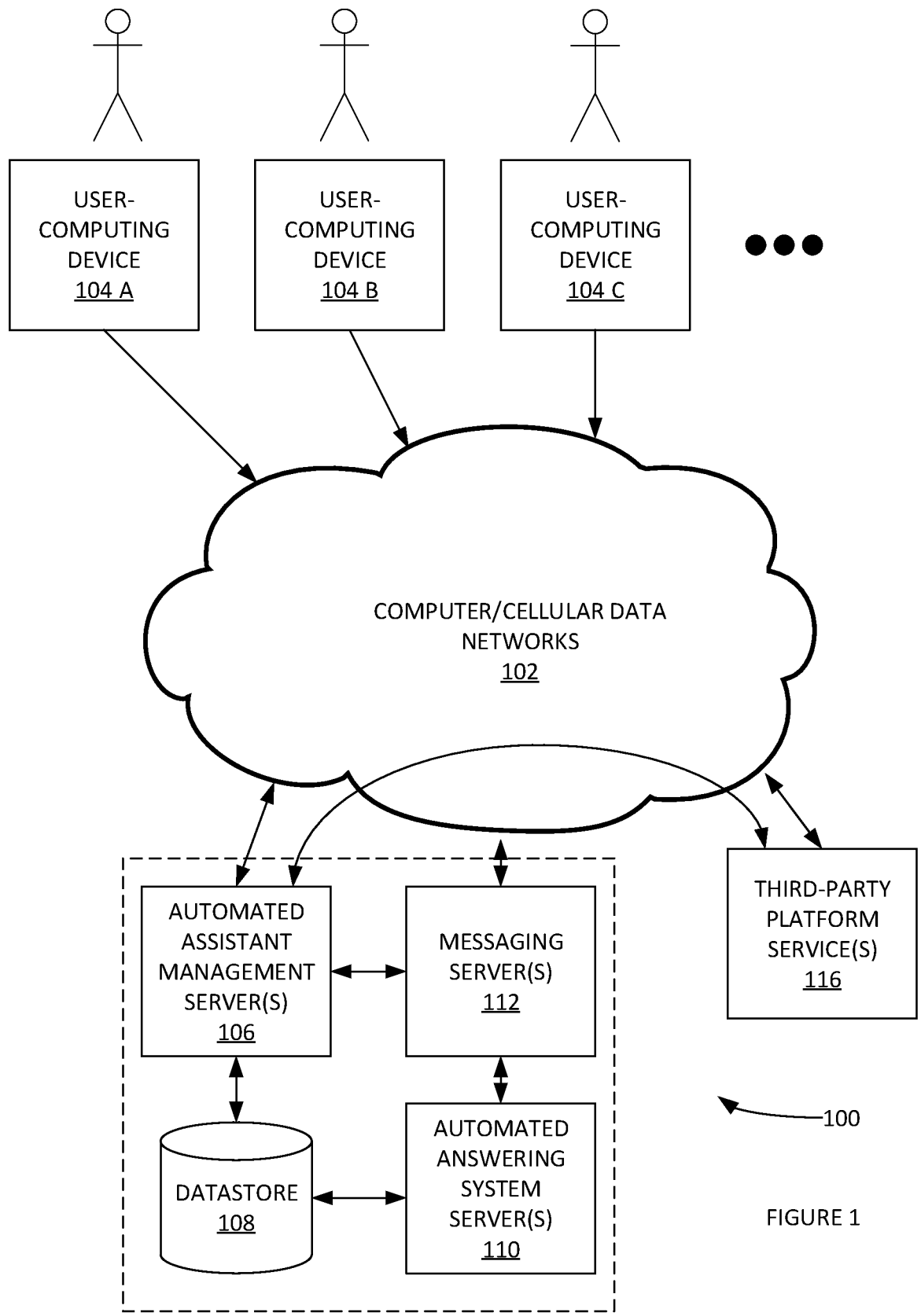
FIG. 1 illustrates an example system for Automated assistant implementation and management, according to some embodiments.

The Figures described above are a representative set, and are not an exhaustive with respect to embodying the invention.

DESCRIPTION

Disclosed are a system, method, and article of manufacture for methods and systems of Automated assistant implementation and management. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Example Definitions

Instant messaging can include a type of online chat that offers real-time text transmission over the Internet.

Application can be a computer program designed to perform a group of coordinated functions, tasks and/or activities for the benefit of the user.

Automated assistant can be a type of conversational agent. For example, an Automated assistant can be a computer program designed to simulate an intelligent conversation with one or more human users via auditory (e.g. computerized text-to-voice methods) or textual methods. Automated assistant can include intelligent personal assistant functionalities.

Dialog system a computer system intended to converse with a human, with a coherent structure (e.g. in a conversational manner). Dialog systems can employ text, speech, graphics, haptics, gestures and/or other modes for communication on both the input and output channel.

Knowledge base can be a store complex structured and unstructured information. The knowledge base can include enterprise information.

Inference Engine can be an Artificial Intelligence tool (e.g. an expert system).

Information retrieval can be the activity of obtaining information resources relevant to an information need from a collection of information resources. Searches can be based on metadata and/or on full-text (or other content-based) indexing. Example information retrieval methods that can be implemented herein include, inter alia: expert search finding, genomic information retrieval, geographic information retrieval, information retrieval for chemical structures, information retrieval in software engineering, legal information retrieval, and/or vertical search.

Intelligent personal assistant can refer to a software agent that can perform various tasks or services (e.g. online tasks or services, etc.) for an individual.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, deep learning, recurrent neural networks (RNN), and K-means and/or sparse dictionary learning. A RNN is a class of artificial neural network where connections between units form a directed cycle.

Mobile device can include smart phones, cell phones, personal digital assistants, tablet computers, wearable computers, smart watches, smart glasses (e.g. GOOGLE GLASS®), etc.

Natural language processing (NLP) can include natural language understanding and other algorithms that enable computers to derive meaning from human and/or other natural language input. NLP can also provide for natural language generation (e.g. convert information from computer databases into readable human language). Natural language generation (NLG) is the natural language processing task of generating natural language from a machine representation system such as a knowledge base or a logical form.

Text message can be a form of an electronic message. Exemplary text messaging systems include, inter alia, short message service (SMS) messages, multimedia messaging service (MMS) message, instant messaging programs for mobile devices (e.g. AVAAMO® messages, IMESSAGES® and the like for other mobile operating systems), other proprietary text messaging applications and/or systems.

Exemplary Computer Architecture and Systems

FIG. 1 illustrates an example system 100 for Automated assistant implementation and management, according to some embodiments. System 100 can provide a general-purpose deployment platform for Automated assistants. For example, system 100 can provide a platform for building Automated assistants, obtaining Automated assistants in an Automated assistant store, managing Automated assistants, and integrating Automated assistants into an extant automated answering system (AAS).

System 100 can include various computer and/or cellular data networks 100. Networks 102 can include the Internet, text messaging networks (e.g. short messaging service (SMS) networks, multimedia messaging service (MMS) networks, proprietary messaging networks, instant messaging service networks, email systems, cellular data network, local-area networks, private enterprise networks, etc. Networks 102 can be used to communicate messages and/or other information from the various entities of system 100 via messaging applications, portals, applications, and voice-based smart assistants.

User-computing devices 104 can be any computing device used by a user to access information provided by application management server(s) 106. For example, user-computing devices 104 can include a web browser, mobile-device application and the like. These can be used to perform the client-side steps of the processes provided infra. User-computing devices 104 can include messaging applications such as a secure mobile messaging application (e.g. an Avaamo® messaging application, etc.). Users can interface with Automated assistants for various services via the messaging applications.

Automated assistant management server(s) 106 can include various functionalities for implementing the processes of FIGS. 4-7. Automated assistant management server(s) 106 can implement a set of Automated assistants (e.g. Automated assistant 202, etc.). Said Automated assistants can provide various automated services. These responses can include specific services based on user's message. Automated assistant management server(s) 106 can interface with other messaging services (e.g. third-party platform services 116) and communication channels. In one example, a messaging services can provide instant messaging service and software application which provides text and voice communication. Automated assistant management server(s) 106 can implement/deploy Automated assistants in these other messaging services. Example, third-party messaging services may include, inter alia, Facebook® messenger, WhatsApp® messenger, Avaamo® messenger, etc.). Automated assistant management server(s) can also implement/deploy Automated assistants in branded assets such as websites, live chat systems, mobile apps, and interactive voice response systems. Develop once and deploy on multiple platforms—using Automated assistant engine the bot can be defined/developed once and the same instance of the bot runtime can be made available in different messaging platforms as well as custom mobile applications. This enables a user to talk to the same bot across multiple platforms and continue conversations from where they were left off irrespective of the platform.

A third-party messaging platform can be any system on the Internet that exchanges messages for the purpose of human communications. For example, a third-party messaging platform can be an online social networking instant messaging service and software application (e.g. FACEBOOK MESSENGER®, other proprietary messaging clients, etc.).

Said Automated assistants can be developed to provide automated-services to company employees or company's customers. For example, an Automated assistant can provide employees with payroll related Information. In another example, an Automated assistant can provide customer support for Telco company users or help with tap-off a phone data or minutes plans. The management server provides for provisions co deploy an Automated assistant for each user-set separately via audience list.

Automated assistant management server(s) 106 can implement underlying platform security operations. This can manage security issues and encrypt all data communicated via various Automated assistant. It can also manage user authentication and authorization. It is noted that, once a user authenticates and validates his authorization (e.g. as a Facebook® user, a Farmers Insurance® company customer, etc.) then there the user need not repeat the process when communicating to an Automated assistant via another Automated assistant channel (see infra for Automated assistant channel discussion). Automated assistant management server(s) 106 can establish federated identity and trust across multiple platforms. All data stored by an Automated assistant can be encrypted as well.

Automated assistant management server(s) 106 can receive analytical data. Automated assistant management server(s) 106 can implement various data analytics operations (e.g. machine learning algorithms, optimizations analysis, etc.). These analytics can be presented to system administrators for review. Example analytics data can include, inter alia: number of Automated assistant messages per channel, total number of users, average Automated assistant response time, use-per-channel statistics, etc.).

System 100 can include messaging server(s) 112. Messaging server(s) 112 can include various functionalities and/or systems (e.g. MMSC, SMSC, Instant messaging server(s), email server(s), APIs, etc.) for communications between the various entities of system 100. It can also be System 100 can include AAS 110. An automated answering system (AAS) server(s) 110 can be implemented. AAS 110 can be utilized by Automated assistants to obtained answers to user queries. AAS 110 can answer questions with meaningful/relevant responses. AAS 110 can analyze natural language queries and understand their meaning using industry-specific ontologies and conversations paths. The questions can be provided from a text messaging system (e.g. a proprietary text messaging system provided via a mobile application). An example interaction pattern may be similar to how users send and/or receive SMS messages on mobile devices. A user can communicate a text message query to AAS service. For example, the text message can be: "Where are we with XYZ opportunity". The AAS service can automatically obtain the answer and provide an automated, contextual response via text message such as: "Status was updated to "Won" by Mike Charles 2 days ago". The AAS service is also capable of including voice to speech functionalities. In this way, a user with a non-touch input mobile device (e.g. GOOGLE GLASS®) can interact with AAS 110. AAS 110 can respond by computing/querying for information from enterprise systems, databases and other information repositories and returning a best match result. AAS 110 can also implement computation on behalf of the user and using users' permissions and privileges (e.g. a level of access granted in computer security). AAS can also respond back with other follow-on actions that can be taken—for instance in the earlier case, the response can also have actions to "View more details" or "Update opportunity or "Congratulate Mike" as a part of the response.

In addition to answering responses AAS 110 can perform specific actions requested and/or implied by a user text message. For example, AAS 110 can forward the response as another text message to another user and/or group. AAS 110 can forward the response in other electronic message formats (e.g. via email and/or SMS). AAS 110 can request to schedule updates and/or responses to the user's query. For example, a user can schedule the same question to be asked on daily, weekly (timely) basis. For example, the question user query may be "What's our current sales pipeline". The user can schedule to automatically communicate this query to AAS 110 every week. Alternatively, AAS 110 need not wait for the automatic weekly query from the user-side application, but rather automatically provide a weekly response to the original query. AAS 110 can include a snooze option. For example, a user can 'snooze' (e.g. delay) the response and ask AAS 110 to remind him/her after a particular period of time. In one example, the user can request What's Jack Blake's phone number" and snooze the response until "5 PM". AAS 110 can communicate the response 5 PM. These examples are provided by way of example and not of limitation.

It is noted that AAS 110 can provide various types of responses according to the information requested in the user query. Reponses can vary from simple text responses to images and specific type of business objects depending on the type of bot (e.g. a virtual agent, an automated or semi-automated tool that carries out repetitive and mundane tasks, etc.).

In some examples, AAS 110 can accept a set of continuous queries/questions. A user can ask a series of related questions wherein a subsequent question can relate to an earlier set of questions/responses. Accordingly, AAS 110 can preserve the context of the conversation. For examples, a question may be: "What is the status of the HP deal?" After one or more subsequent query/response iterations, the user may wish to obtain further/deeper information about the HP deal. The user can query: "Who is working on this deal", "When was the last activity on this deal", or another query related to an earlier provided for 'deal'. AAS 110 can relate/link the word 'deal' back to an earlier query or set of queries. AAS 110 can then provide a contextually meaningful response.

AAS can review at the user input and can process specific keywords, phrases and find the closest match and relevant match. It can also learn the contextual reference to keywords and phrases based on user responses. AAS can dynamically generate conversation paths based on the implied meaning of the user responses.

AAS services can be provided as part of a subscription service. Users can subscribe to various categories of AAS. AAS 110 can specialize in various information genres.

Various categories of AAS services can be provided. For example, a public AAS can provide generic services. The public AAS can used by any user across an organization/ enterprise. The response can also be generic and not specific to any organization's business applications. An example of a generic AAS service can be a support AAS (e.g. technical support service, news, stock information, etc.). Private proprietary AAS services can also be provided. This AAS can be configured specifically by each organization based on the target business application(s) they would like to service. For example, a sales AAS can be used to answer specific sales-related queries for an organization. The sales AAS can be tied to the organizations sales application. The sales AAS can have access to the sales application resources and/or databases. Another example, can be a human resources AAS that answers queries specifically for an organization's human-resources applications.

In one embodiment, AAS 110 can traverse multiple business applications (e.g. human resources, sales, shipping and tracking, customer relationship management, marketing, accounting, expense management, etc.). In one example, each AAS need not be tied to a business application (e.g. SALESFORCE®, ORACLE ERP®, etc.). Rather, AAS 110 can transverse multiple business applications. For example, if the organization uses Salesforce® for tracking opportunities and uses UPS® to ship packages to its customers, AAS 110 can traverse across these systems to respond to questions/queries from users. For example, continuing a previous example, a user may provide the query "did we close the HP deal?" The user can then query the same AAS: "Did we ship the CD to HP?" The AAS can obtain the information from the shipping department, parse it, and generate a response: "Yes—it was shipped on Monday—the tracking code is UX23124".

A user can setup specific notifications associated with AAS 110. These notifications can be setup when the user implements a "schedule" action up receipt of a response. The user can also review all the notifications they have set for each AAS, change or update them as necessary. AAS 110 can be implemented without exposure of data to an enterprise's IT department. AAS 110 can also be provided with a colloquial language element (e.g. jokes, snide comments, etc.).

Data store 108 can include various data/information utilized by Automated assistant server(s) 106, AAS servers 110 and/or messaging server(s) 114. For example, data store 108 can include smart card information (as provided infra). Data store 108 can include information used to generated natural-language responses in various languages.

Figure 2:
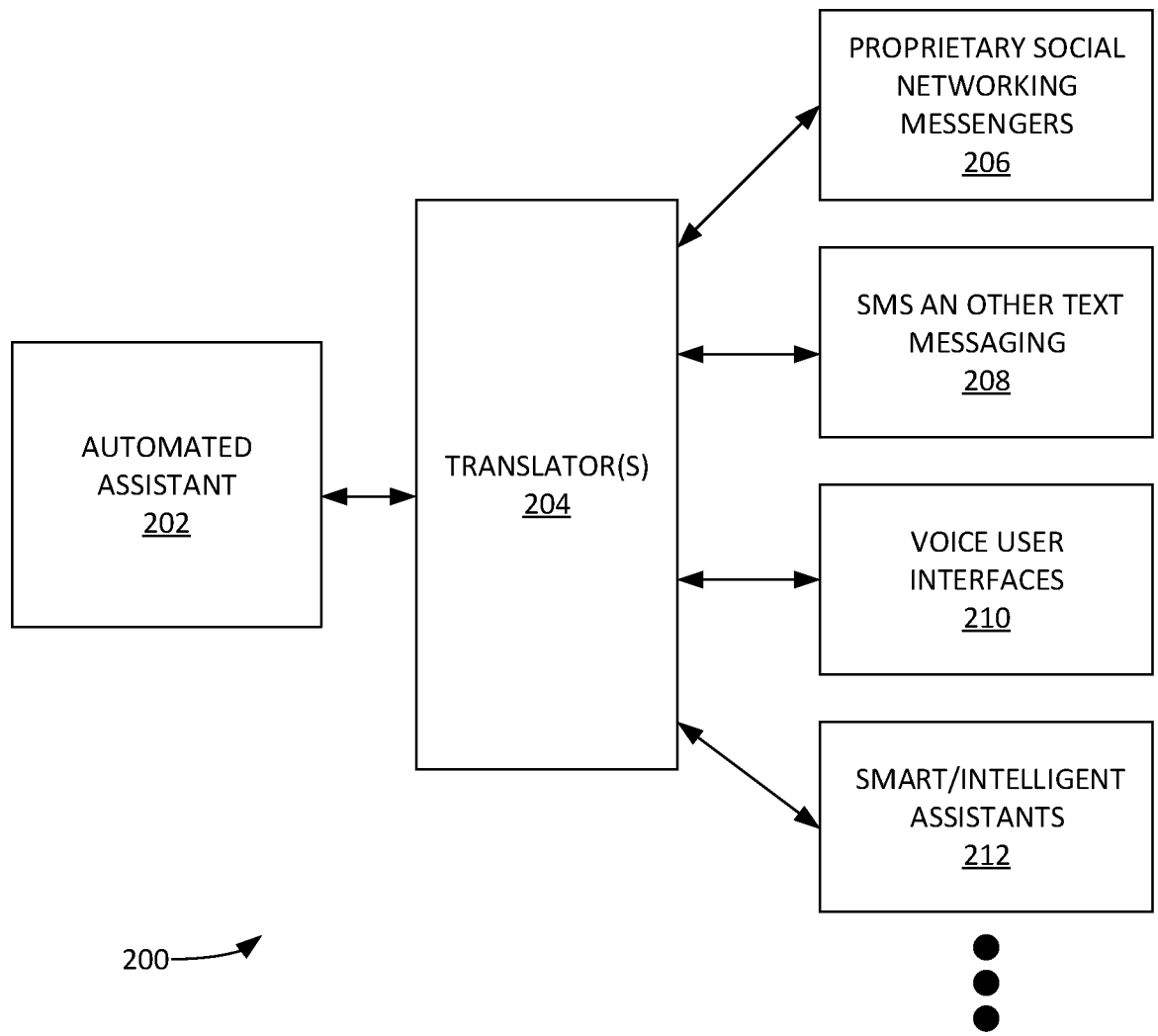
FIG. 2 illustrates an example Automated assistant translator system, according to some embodiments.

FIG. 2 illustrates an example Automated assistant translator system 200, according to some embodiments. Automated assistant 202 can be a type of conversational agent that simulates an intelligent conversation with one or more human users via auditory or textual methods. Automated assistant 202 can be deployed on one or more third-party messaging platforms (e.g. third-party messaging platforms 206-212, portals, and voice-based smart assistants, etc.). Automated assistant 202 can receive conversational input from a human user via third-party messaging platforms 206-212. Automated assistant 202 can retrieve information for the users based on the content of the user input. Automated assistant 202 can generate a natural-language output that includes the information. For example, Automated assistant 202 can implement content determination. Automated assistant 202 can decide what information to mention in the text. Automated assistant 202 can implement document structuring. For example, Automated assistant 202 can implement can provide overall organization of the information to convey. Automated assistant 202 can implement aggregation (e.g. merging of similar sentences to improve readability and naturalness). Automated assistant 202 can implement lexical choice (e.g. putting words to the concepts). Automated assistant 202 can implement referring expression generation (e.g. creating referring expressions that identify objects and regions, etc.). Automated assistant 202 can implement realization operations (e.g. e.g. creating the actual text, which is correct according to the rules of syntax, morphology, and orthography). Automated assistant 202 can provide the natural-language output to translator(s) 204.

Translator 204 can include one or more specific translators (e.g. runtime translators) that translate Automated assistant output into each messaging platform's protocol. Translator 204 can include runtime code that puts in a particular messaging platform's format. For example, translator 204 can be aware of third-party messaging platforms 206-212 capabilities. For example, translator 204 can knows what Facebook® messenger has a policy of no offers. Accordingly, translator 204 can automatically translate an offer into a hyperlink for posting. The Automated assistant output can then be published on the respective third-party messaging platforms 206-212. It is noted that third-party messaging platforms 206-212 can each include their own respective protocols (e.g. prohibits publishing hyperlinks, character limitations, etc.). It is noted that Automated assistant 202 can SMS, various proprietary corporate messaging applications, Voice user-interfaces (UI), and smart assistants (eg. Alexa®, Google Assistant®, etc.).

Figure 3:
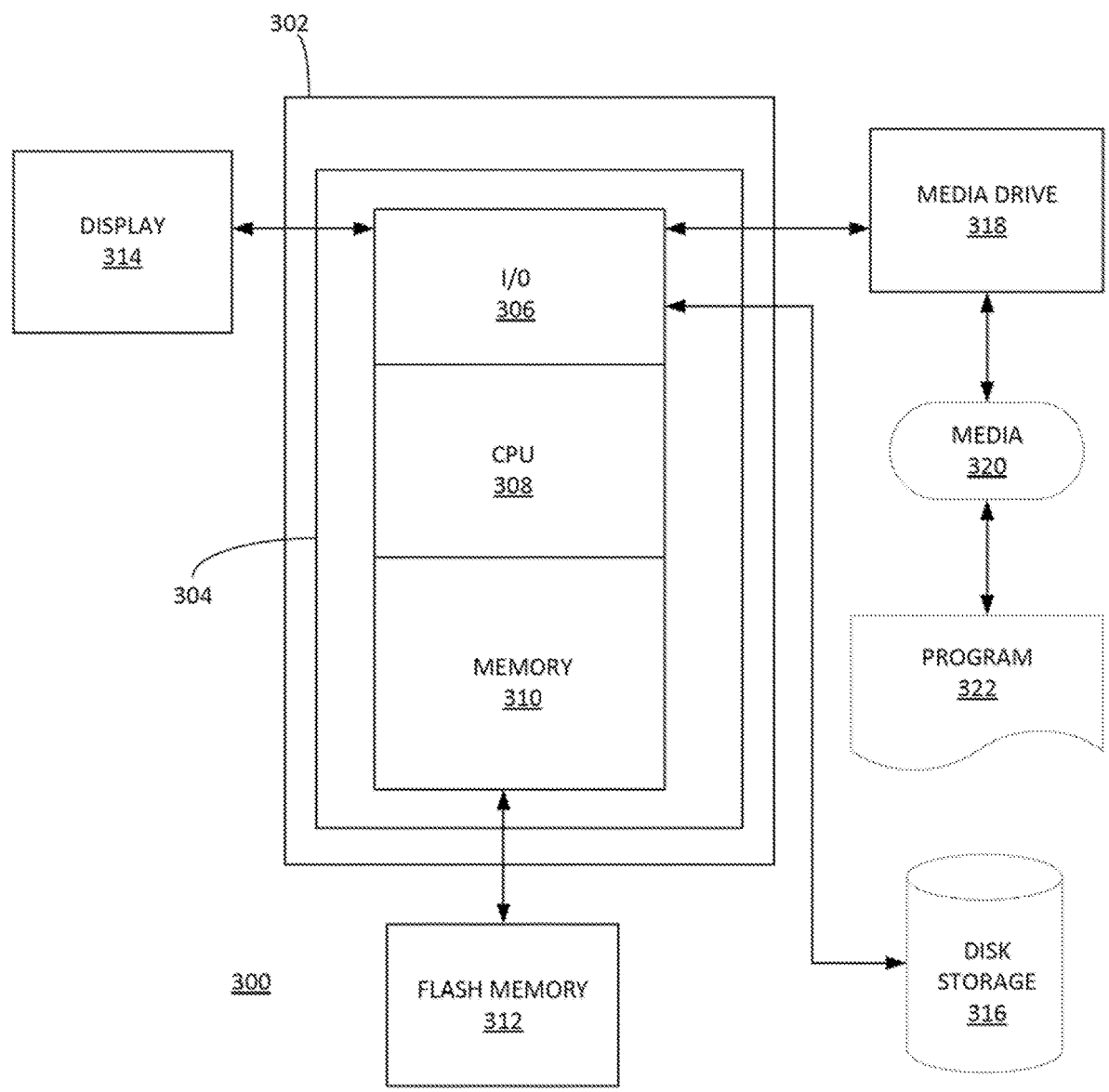
FIG. 3 depicts an exemplary computing system that can be configured to perform any one of the processes provided herein.

FIG. 3 depicts an exemplary computing system 300 that can be configured to perform any one of the processes provided herein. In this context, computing system 300 may include, for example, a processor, memory, storage, and I/O devices (e.g., monitor, keyboard, disk drive, Internet connection, etc.). However, computing system 300 may include circuitry or other specialized hardware for carrying out some or all aspects of the processes. In some operational settings, computing system 300 may be configured as a system that includes one or more units, each of which is configured to carry out some aspects of the processes either in software, hardware, or some combination thereof.

FIG. 3 depicts computing system 300 with a number of components that may be used to perform any of the processes described herein. The main system 302 includes a motherboard 304 having an I/O section 306, one or more central processing units (CPU) 308, and a memory section 310, which may have a flash memory card 312 related to it. The I/O section 306 can be connected to a display 314, a keyboard and/or other user input (not shown), a disk storage unit 316, and a media drive unit 318. The media drive unit 318 can read/write a computer-readable medium 320, which can contain programs 322 and/or data. Computing system 300 can include a web browser. Moreover, it is noted that computing system 300 can be configured to include additional systems in order to fulfill various functionalities. Computing system 300 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 4:
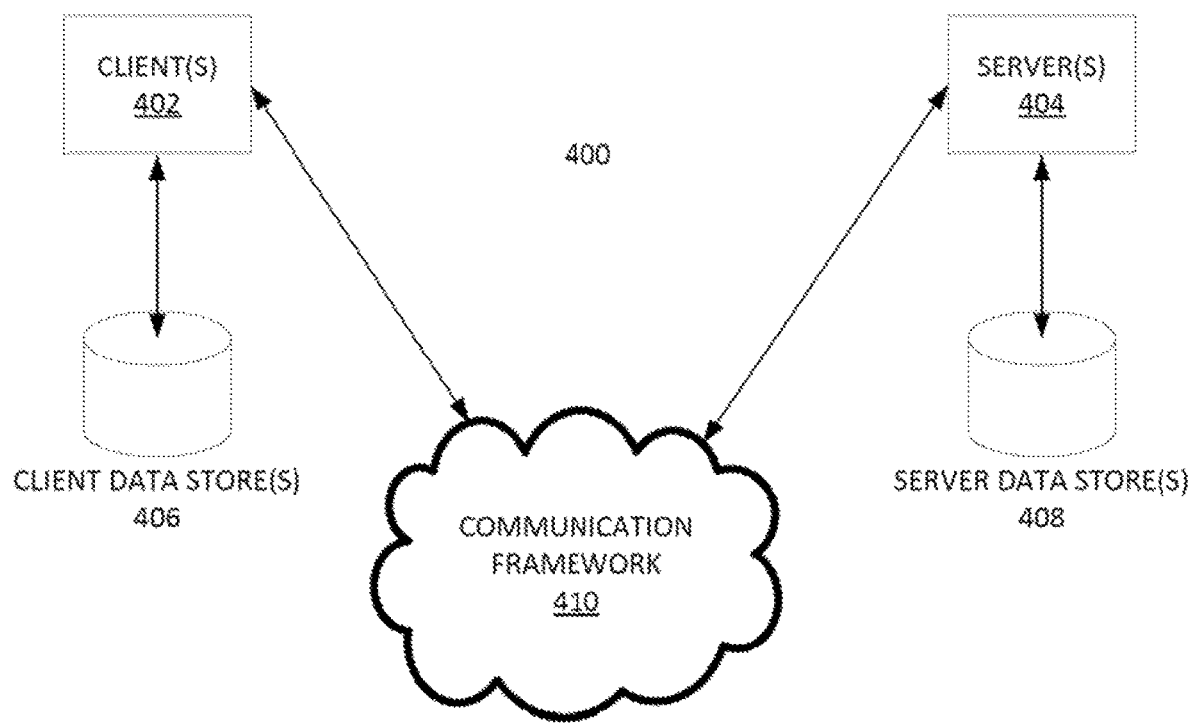
FIG. 4 is a block diagram of a sample-computing environment that can be utilized to implement various embodiments.

FIG. 4 is a block diagram of a sample-computing environment 400 that can be utilized to implement various embodiments. The system 400 further illustrates a system that includes one or more client(s) 402. The client(s) 402 can be hardware and/or software (e.g., threads, processes, computing devices). The system 400 also includes one or more server(s) 404. The server(s) 404 can also be hardware and/or software (e.g., threads, processes, computing devices). One possible communication between a client 402 and a server 404 may be in the form of a data packet adapted to be transmitted between two or more computer processes. The system 400 includes a communication framework 410 that can be employed to facilitate communications between the client(s) 402 and the server(s) 404. The client(s) 402 are connected to one or more client data store(s) 406 that can be employed to store information local to the client(s) 402. Similarly, the server(s) 404 are connected to one or more server data store(s) 408 that can be employed to store information local to the server(s) 404. In some embodiments, system 400 can instead be a collection of remote computing services constituting a cloud-computing platform.

Figure 5:
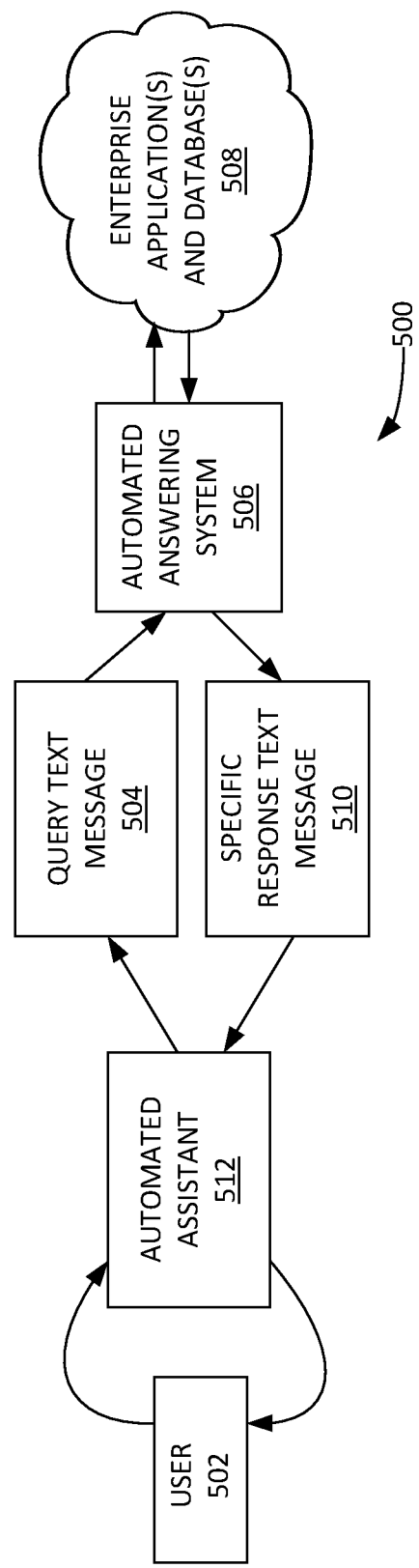
FIG. 5 illustrates an example computerized process of an AAS, according to some embodiments.

FIG. 5 illustrates an example computerized process 500 of an AAS 506, according to some embodiments. In a step of process 500, a user 502 can use a text messaging and/or other client-side application to compose and communicate a query text message 504 to a designated AAS 506. These communications can be performed via Automated assistant 512. Automated assistant 512 can be a conversational agent that provides a conversational interface for a user to interact with AAS 506.

User identification data and/or other metadata (e.g. context data such as location, etc.) can also be communicated to the AAS 506. It is noted that in some embodiments, a voice message can be communicated in lieu of a text message. A speech-to-text functionality can then be used to convert the voice message to a computer-readable medium. AAS 506 can then parse and analyse the incoming text message. AAS 506 can determine one or more information sources (e.g. various enterprise applications and/or databases 508, third-party data sources such as online social networks, news aggregators, sports information sources, other knowledge bases, etc.). AAS 506 can query the one or more information sources and receive the information relevant to the user's query.

It is noted that the type of information obtained by AAS 506 can depend on the identity of the user providing query text message 504. In one example, a user can undergo a user-authentication process to establish identity and/or permissions with AAS 506. In another example, user authentication can be automatically performed based on user identity and/or other metadata obtained from such sources as the text message (e.g. device origin/location), user identity metadata from a client-side application in the user's mobile device, etc.

AAS 506 can generate a natural language text message. As opposed to a search result with a plethora of results, AAS 506 can generate a single response. In the event that one or more options may be possible, AAS 506 can provide queries to the user to determine a most relevant response to the user. Moreover, AAS 506 can query a user to provide explanations that assist AAS 506 in information retrieval and/or natural language generations steps.

Figure 6:
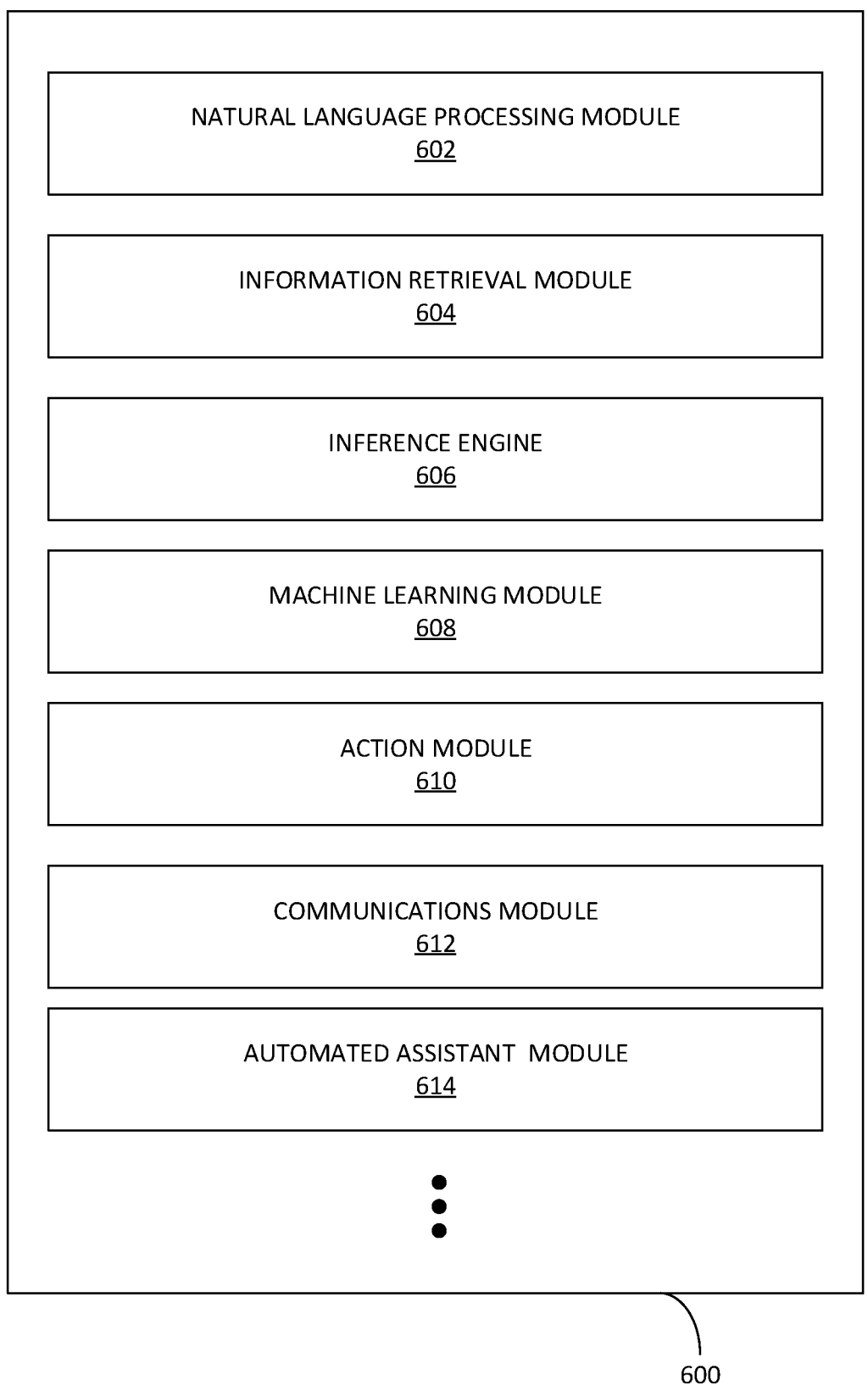
FIG. 6 provides an example computerized AAS system that includes an Automated assistant, according to some embodiments.

FIG. 6 provides an example computerized AAS system 600 that includes an Automated assistant, according to some embodiments. AAS system 600 can implement any AAS method provided herein. AAS system 600 can receive and interpret text message queries from an authorized user. AAS system 600 obtain information to answer said queries from a relevant data source (e.g. with information retrieval algorithms). AAS system 600 generate specific text message response to the user's query. AAS system 600 can communicate said specific text message responses to the user's mobile device.

For example, AAS system 600 can include a natural language processing (NLP) module 602. NLP module 602 can implement natural language understanding, part-of-speech tagging, parsing, relationship extraction and/or other NLP algorithms for interpreting an incoming user-generated texts. Moreover, NLP module 602 can include functionalities for generating a NLP text message (and/or other message type—e.g. text-to-speech for generation of voice messages, etc.). NLP can also support multiple languages as well as phrases not just keywords AAS system 600 can include information retrieval module 604. Information retrieval module 604 can query various information sources relevant to a user's query. Information retrieval module 604 can also obtain information from various third-party sources (e.g. Google® search, retail websites, news websites, sports websites, etc.). Information retrieval module 604 can determine one or more best sources for query relevant information.

AAS system 600 can include an inference engine 606. Inference engine 606 can draw conclusions by analyzing queries in light of a database of expert knowledge it draws upon. Inference engine 606 can reach logical outcomes based on the premises the data establishes. Inference engine 606 can also utilize probability calculations to reach conclusions that the knowledge database doesn't strictly support, but instead implies. In one example, inference engine 606 can cycle through three sequential steps: match rules, select rules, and execute rules. The execution of the rules can result in new facts or goals being added to the knowledge base which will trigger the cycle to repeat. This cycle continues until no new rules can be matched. Accordingly, a single user response can be built and refined. Inference engine 606 can pulling all data that a user has permission to access. Inference engine 606 can determine a response that is best match of information for the user (e.g. based on a user identification and the content of the user's query).

Machine learning module 608 can learn from previous queries and responses. This can be used to increase the accuracies of later responses. For example, a user can query: "What is the status of the HP deal?" However, the token 'HP' may not be recognized. Machine learning module 608 can cause a counter query to the user to be generated and sent. The counter query can be: "What is HP?" The user can respond via text message: "Hewlett Packard". The machine learning module 608 can then interpret later uses of the token 'HP' with 'Hewlett Packard'. In other examples, tokens can be learned on a user by user basis and/or a time period basis.

Action module 610 enable a user to take actions on information returned in a response to the user's query. Example actions are provided supra. For example, a user can schedule repeat queries and/or responses to be obtained and delivered on a scheduled basis. The user can forward responses to other system users. The user can provide other actions to an AAS.

Communications module 612 can interact with application programming interfaces (API) of other entities and/or various systems within an enterprise (e.g. human resources database, sales portal, etc.) to obtain information. Communications module 612 can interact mobile-side client applications. Communications module 612 can obtain information from the other modules of and compose natural languages messages (e.g. emails, text messages, push notifications, augmented-reality messages, etc.) to users. Accordingly, communications module 612 can include various human language Natural Language Generation (NLG) functionalities and/or human-language translations functionalities. Communications module 612 can also implement various context awareness methods to determine a user's current context (e.g. location, enterprise context such as position in an enterprise, calendar information, etc.).

When the user asks the question for the first time, AAS system 600 can prompt the user to provide access to the target enterprise system using their username/password or author any other type of authorization challenge. AAS system 600 can aggregate data across all users within the same entity (e.g. company) and partition the data across each target enterprise system (e.g. Salesforce®, expenses, payments etc.). In this way, a representative data set can be created for an entire organization. Additionally, result-sets can be optimized based on the aggregated data. AAS system 600 can pull in changes in dataset from the target applications on a scheduled and/or real-time basis. An initial association map per enterprise application can be fed to the AAS system 600. For instance, if AAS system 600 is automating responses from a Salesforce® application, an initial association map can represent a map of enterprise object and the actions that can be performed on these objects. A loopback from user on responses can enable AAS system 600 maintain the association map up to date. AAS system 600 can update the association map based on user questions and accuracy of responses back from the user. AAS system 600 can further include other functionalities (not shown). For example, AAS system 600 can include a user-subscription manager, user-authentication manager, scheduling/calendar modules, user registration and membership managers, etc.

Automated assistant module 614 can implement a dialog system for various practical purposes including customer service or information acquisition. Automated assistant module 614 can use natural language processing systems. Automated assistant module 614 can scan for keywords within the input, then obtain a reply with the most matching keywords and/or the most similar wording pattern, from a database. In some embodiments, Automated assistant module 614 can uses artificial intelligence to provide customer service or other assistance (e.g. via a website, messaging application, etc.). Automated assistant module 614 can include a dialog system. Automated assistant module 614 can implement an avatar. Automated assistant module 614 can include an expert system to provide specific expertise to the user. Automated assistant module 614 can include an intelligent agent for implementing specified tasks requested by a user. Automated assistant module 614 can include an input recognizer/decoder. Input recognizer/decoder can convert a user's input (e.g. text, speech, gesture, etc.) to plain text. Automated assistant module 614 can include a Natural language understanding unit (NLU) that analyzes said text. NLU can include functionalities for, inter alia: proper name identification; part of speech tagging; a syntactic/semantic parser; etc. Semantic information can be analyzed by a dialog manager. The dialog manager can store the history and state of the dialog and manage the general flow of the conversation. The dialog manager can contact one or more task managers (e.g. AAS 506, etc.) that have knowledge of the specific task domain. The dialog manager can produce output using an output generator, which may include: natural language generator, gesture generator, layout engine, etc. The output can be rendered using an output renderer, which may include: text-to-speech engine (TTS) talking head robot or avatar.

Automated assistant module 614 can include an Automated assistant builder application (e.g. see infra). Automated assistant module 614 can provide and manage an Automated assistant store. The Automated assistant store can enable users to purchase pre-generated Automated assistants (e.g. based on topic, conversation style, for deployment on a specified third-party messaging platform, etc.). The Automated assistant store can also enable users to purchase portions of Automated assistants and/or specified Automated assistant functionalities for deployment in a user assembled/created Automated assistant. An Automated assistant store can include payment systems, search-engine systems, recommendation systems, etc. In this way, a user can provide queries and seek recommendations for various Automated assistant(s) and/or Automated assistant functions to obtain and include in an Automated assistant being built by the user.

Example Methods

Figure 7:
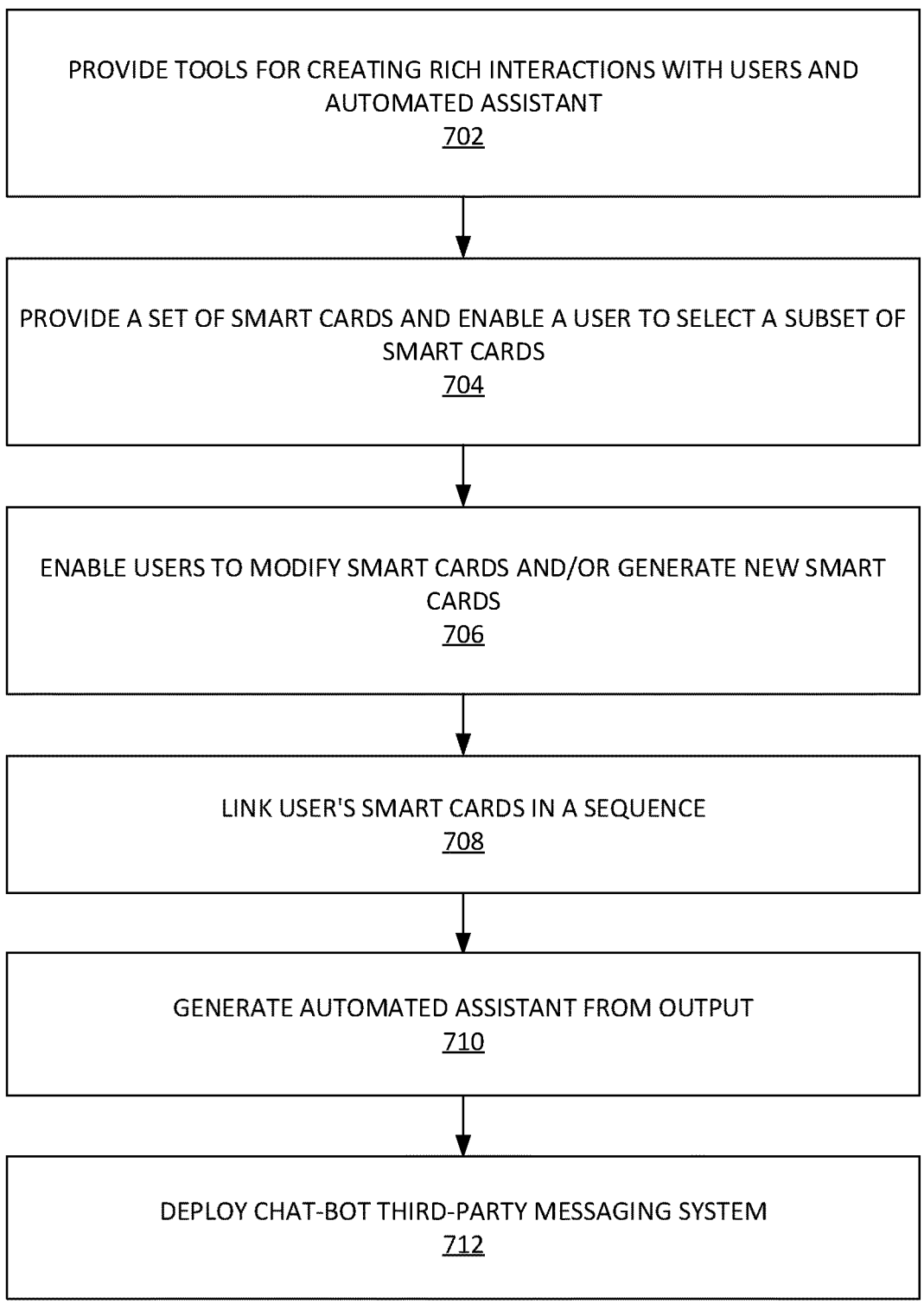
FIG. 7 illustrates an example process for generating an Automated assistant, according to some embodiments.

FIG. 7 illustrates an example process 700 for generating an Automated assistant, according to some embodiments. In step 702, process 700 can provide tools for creating rich interactions with users and an Automated assistant. These tools can include a user interface for selecting, creating and/or modifying smart cards. A smart card can be a graphical element that enable users to select/input rich content for an Automated assistant to utilize in a sequential interaction (e.g. as a sequential decision tree, etc.) with a user.

In step 704, process 700 can provide a set of smart cards and enable a user to select a subset of smart cards. In step 706, process 700 can enable users to modify smart cards and/or generate new smart cards. For example, process 700 can enable a user to build their own rich smart cards that can be placed into a conversational pattern. Process 700 present menus to users to combine other features (e.g. NLP, voice-to-text, text-to-voice, etc.).

In step 708, process 700 can link user's smart cards in a sequence. In step 710, process 700 can generate Automated assistant from output of step 708. Process 700 can deploy the Automated assistant third-party messaging system. For example, once a create an Automated assistant can be deployed to Facebook® messenger, WeChat®, SMS, Skype®, Telegram® IM service, a specified web interface, an Avaamo® platform, a proprietary mobile application, etc. Step 708 can implement deployment aspects of Automated assistant deployment. For example, users can specify specific runtime translators for the Automated assistant into a set of messaging platforms. In this way, a user can build an Automated assistant once and then deploys it on a set of specified messaging platforms. The runtime translators can enable runtime translation to each messaging platform. The Automated assistant need not be deployed multiple times. A translator can be aware of each messaging platform's capabilities and protocols. A translator can ensure that Automated assistant output content that violates a specified messaging platform's protocols is suppressed and/or placed into an allowed form. The translator can include a runtime code that puts the Automated assistant's output into the messaging platform's format.

In one example, an Automated assistant can be an insurance agent that sits inside an Avaamo application. The Automated assistant can obtain information and directions from a relevant enterprise platform. The Automated assistant can use a translator interact with a user via multiple messaging platforms. For example, a user can initiate a conversation with the Automated assistant via Facebook® messenger. The user can then switch to communicating to the chat bat via a web interface provided in the insurance company's web site. The Automated assistant can track the user and communicate to the user regardless of the user's current messaging platform (e.g. the Automated assistant can service user queries irrespective of origin of user). The Automated assistant doesn't need a different interface for each messaging platform.

An Automated assistant can follow a channel paradigm. Each Automated assistant can interact with users via various different channel. Each channel can correspond to a specified messaging platform. Each channel has its own runtime translator. The Automated assistant's inbox can be a single inbox through which the Automated assistant can process user queries and communicate responses. In this way, an Automated assistant can be built and deployed once. Additional channels can be dynamically added in runtime. Each channel can have its own translator.

Automated assistants can be designed to handle both structured and non-structured input and output. For example, an Automated assistant can provide a graphical element that enables a user to select from provided set of options. In another example, a user provides text or voice input. An Automated assistant can query a user. For example, an Automated assistant can provide the user's the following queries, inter alia: "what is your name", "what is your start date", etc. The Automated assistant can also request structured input and provide structured responses (e.g. based on smart card content).

Process 700 can utilize a conversation builder. The conversation builder can include a UI-based method of specifying how an Automated assistant is to behave. A user can build out multiple stories, including, a greeting story (e.g. when a user says "hello" or uses an alternative greeting—then a builder can specify what the Automated assistant's response is using a text, a smart card, a smart card with a form, etc.). Process 700 can define multiple story blocks on how the bot is to function.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized method useful for implementing and managing an Automated assistant translator between an Automated assistant service and a plurality of third-party messaging platforms comprising:
    deploying an Automated assistant in a plurality of third-party messaging platforms;
    with the Automated assistant:
        receiving a conversational input from a human user via a first third-party messaging platform of the plurality of third-party messaging platforms;
        parsing the conversation input;
        determining a request for additional information in the conversation input;
        retrieving a set of information relating to the request for additional information in the conversation input;
        generating a natural-language output that includes the information; and
        providing the natural-language output to a translator system, wherein the translator system comprises one or more specific runtime translators that translate an Automated assistant output into each messaging platform's protocol of the plurality of third-party messaging platforms, and
        wherein the first third-party messaging platform comprises an online social networking messaging platform, and
        wherein the first third-party messaging platform has a rule that prohibits commercial offers in a third-party messaging platform message;
    with the translator system:
        converting the natural-language output to a format of the first third-party messaging platform; and
        communicating the converted form of the natural-language output that is the format of the first third-party messaging platform to the first third-party messaging platform.

2. The computerized method of claim 1, wherein an Automated assistant comprises an automated virtual conversational agent that simulates a conversation with one or more human users using the natural-language output.

3. The computerized method of claim 2, wherein the natural-language output comprises an auditory natural-language output.

4. The computerized method of claim 3, wherein the natural-language output comprises a textual natural-language output.

5. The computerized method of claim 1 further comprising:
    with the translator system:
        detecting that the content of the natural-language output comprises a commercial offer;
        removing the commercial offer content of the natural-language output;
        generating a hyperlink to a webpage with additional information about the commercial offer; and
        inserting the hyperlink into the converted form of the natural-language output that is the format of the first third-party messaging platform.

6. The computerized method of claim 1, wherein the first third-party messaging platform has a rule that limits a number of text characters in the third-party messaging platform message.

7. The computerized method of claim 6 further comprising:
    with the translator system:
        detecting that the content of the natural-language output exceeds the rule that limits the number of text characters;

shortening the content of the natural-language below a number of text characters below the rule that limits the number of text characters;

generating a hyperlink to a webpage with an unshortened version of the content of the natural-language output; and inserting the hyperlink into the converted form of the natural-language output that is the format of the first third-party messaging platform.

8. A computer system useful for implementing and managing an Automated assistant translator between an Automated assistant service and a plurality of third-party messaging platforms comprising:

a processor;

a memory containing instructions when executed on the processor, causes the processor to perform operations that:

deploy an Automated assistant in a plurality of third-party messaging platforms;

with the Automated assistant:

receive a conversational input from a human user via a first third-party messaging platform of the plurality of third-party messaging platforms;

parse the conversation input;

determine a request for additional information in the conversation input;

retrieve a set of information relating to the request for additional information in the conversation input;

generate a natural-language output that includes the information; and provide the natural-language output to a translator system, wherein the translator system comprises one or more specific runtime translators that translate an Automated assistant output into each messaging platform's protocol of the plurality of third-party messaging platforms, and wherein the first third-party messaging platform comprises an online social networking messaging platform, and wherein the first third-party messaging platform has a rule that prohibits commercial offers in a third-party messaging platform message;

with the translator system:

convert the natural-language output to a format of the first third-party messaging platform; and communicate the converted form of the natural-language output that is the format of the first third-party messaging platform to the first third-party messaging platform.

9. The computerized system of claim 8, wherein an Automated assistant comprises an automated virtual conversational agent that simulates a conversation with one or more human users using the natural-language output.

10. The computerized system of claim 9, wherein the natural-language output comprises an auditory natural-language output.

11. The computerized system of claim 10, wherein the natural-language output comprises a textual natural-language output.

12. The computerized system of claim 8 further comprising:

wherein the translator system:

detects that the content of the natural-language output comprises a commercial offer;

removes the commercial offer content of the natural-language output;

generates a hyperlink to a webpage with additional information about the commercial offer; and inserts the hyperlink into the converted form of the natural-language output that is the format of the first third-party messaging platform.

13. The computerized system of claim 8, wherein the first third-party messaging platform has a rule that limits a number of text characters in the third-party messaging platform message.

14. The computerized system of claim 13 further comprising:

wherein the translator system:

detects that the content of the natural-language output exceeds the rule that limits the number of text characters;

shortens the content of the natural-language below a number of text characters below the rule that limits the number of text characters;

generates a hyperlink to a webpage with an unshortened version of the content of the natural-language output; and inserts the hyperlink into the converted form of the natural-language output that is the format of the first third-party messaging platform.

* * * * *